United States Patent [19]

Salge et al.

[11] Patent Number: 5,275,989

[45] Date of Patent: Jan. 4, 1994

[54] CERAMIC COMPOSITION FOR THE PRODUCTION OF THE TOP LAYER OF TWO-LAYERED STONEWARE TILES

[75] Inventors: Henning Salge, Cologne, Fed. Rep. of Germany; Christian Schlegel, Venegono Sup., Italy

[73] Assignee: Bayer Italia S.p.A., Milan, Italy

[21] Appl. No.: 775,566

[22] Filed: Oct. 15, 1991

[30] Foreign Application Priority Data

Oct. 25, 1990 [IT] Italy ................. 21877 A/90

[51] Int. Cl.$^5$ ........................ C04B 33/04; C04B 33/24
[52] U.S. Cl. ...................................... 501/143; 501/144
[58] Field of Search ................ 501/143, 144, 141, 145

[56] References Cited

FOREIGN PATENT DOCUMENTS 0300532 1/1989 European Pat. Off. .
660928 5/1938 Fed. Rep. of Germany .
417125 10/1934 United Kingdom .

OTHER PUBLICATIONS

*Dictionary of Ceramic Engineering* Loran S. O'Bannon (1984) p. 146. Plenum Press.

*Primary Examiner*—Mark L. Bell
*Assistant Examiner*—Paul Marcantoni
*Attorney, Agent, or Firm*—Connolly & Hutz

[57] ABSTRACT

A composition useful for the top layer of two-layered stoneware or semi-stoneware tiles has, with or without added coloring substances or pigments, the following composition:

| | |
|---|---|
| Clay (white burning) | 13–40% by weight, |
| Wollastonite | 0–25% by weight, |
| Potassium feldspar | 8–32% by weight, |
| Sodium feldspar | 5–15% by weight, |
| Lithium feldspar | 0–12% by weight, |
| Nepheline-Syenite | 3–15% by weight, |
| Frit | 0–25% by weight, |
| ZnO | 0–5% by weight, |
| Calcined kaolin/clay | 6–24% by weight, |
| Calcined aluminum oxide | 3–16% by weight, and |
| ZrSiO$_4$ | 0–10% by weight. |

3 Claims, No Drawings

CERAMIC COMPOSITION FOR THE PRODUCTION OF THE TOP LAYER OF TWO-LAYERED STONEWARE TILES

The present invention relates to ceramic compositions for the production of the top layer of two-layered unglazed stoneware tiles.

BACKGROUND OF THE INVENTION

Both densely burned, unglazed and glazed stoneware tiles are known from the literature. Both types of tiles have their advantages and disadvantages. Densely burned, unglazed stoneware tiles have greater surface hardness and wear resistance than glazed tiles but glazed tiles offer a wider range of possibilities for decorative surfaces. This includes not only the use of ceramic decorative finishes on or under the glaze but also a wider range of colors for glazes.

Conventional unglazed ceramic stoneware compositions which burn to a light color and have suitable characteristics for dense burning and the required stain resistance are fired at temperatures above 1200° C. As their burned color is non-white, however, they cannot be obtained in luminous and saturated color shades. Moreover, they are frequently sensitive to stains due to a slight residual porosity. Added to this is the problem that the clays required for producing densely burned stoneware tiles with a light burned color are not always readily available. Only a few natural deposits are known, and these have only limited reserves (e.g. Westerwald).

Stoneware or semi-stoneware tiles fired at low temperatures and having a water absorption capacity greater than about 0.3% by weight are generally sensitive to staining if they have not been glazed. For obtaining closed, dense surfaces, these products must be glazed. On the other hand, clays which are widely available but burn to a dark color may be used for the manufacture of such products.

The problem therefore arose of providing compositions which, when applied as a relatively thick top layer to a basic (more or less colored) stoneware or semi-stoneware body, could be used for the production of stoneware tiles which at least on the surface sinter to a dense structure, are abrasion resistant and can be colored in luminous colors with a high degree of saturation with coloring materials even at relatively low concentrations. Semi-stoneware is generally understood as having a residual porosity of 3-6%.

This problem has been solved by means of the compositions according to the invention.

BRIEF DESCRIPTION OF THE INVENTION

The invention relates to ceramic compositions for the production of the top layer of two-layered stoneware or semi-stoneware tiles, characterised in that they are composed as follows:

| | |
|---|---|
| Clay (white burning) | 13–40% by wt. |
| Wollastonite | 0–25% by wt. |
| Potassium feldspar | 8–32% by wt. |
| Sodium feldspar | 5–15% by wt. |
| Lithium feldspar | 0–12% by wt. |
| Nepheline-Syenite | 3–15% by wt. |
| Frit | 0–25% by wt. |
| ZnO | 0–5% by wt. |
| Calcined kaolin/clay | 6–24% by wt. |
| Calcined aluminium oxide | 3–16% by wt. |
| ZrSiO$_4$ | 0–10% by wt. | and have a shrinkage in drying and firing of from 4–12% and a thermal coefficient of expansion of $(50-90) \times 10^{-7}$ °$K^{-1}$ (at 20° to 400° C.) and optionally contain coloring materials and/or pigments up to a maximum of 5% by weight.

DETAILED DESCRIPTION

The invention further relates to the use of the ceramic compositions according to the invention for the production of the top layer of two layered pressure moulded stoneware or semi-stoneware tiles. In such top layer, the composition of this invention consists essentially of:

| | |
|---|---|
| Clay (white burning) | 13–40% by weight, |
| Wollastonite | 0–25% by weight, |
| Potassium feldspar | 8–32% by weight, |
| Sodium feldspar | 5–15% by weight, |
| Lithium feldspar | 0–12% by weight, |
| Nepheline-Syenite | 3–15% by weight, |
| Frit | 0–25% by weight, |
| ZnO | 0–5% by weight, |
| Calcined kaolin/clay | 6–24% by weight, |
| Calcined aluminum oxide | 3–16% by weight, |
| ZrSiO$_4$ | 0–10% by weight, | with or without coloring materials and/or pigments.

The compositions according to the invention result in top layers which have a water absorption capacity of zero and consist of a vitreous phase and crystalline phases.

The top layers produced with the compositions according to the invention are stain resistant, dense and free from blisters and have an almost white burned color and great wear resistance. The top layers thus produced may be colored with all conceivable coloring substances so that luminous color shades can also be obtained. Since only the top layer and not the whole tile need now be colored, there is a saving in the quantity of coloring substance normally required. Further, the compositions according to the invention are capable of forming relatively thick top layers (up to ¼ of the toal thickness) without causing curvatures in the finished tiles and without the edges of the tiles showing any tendency to burst. Moreover, the thickness of the top layer enables such tiles to be sanded and polished. In order to obtain a firm bond between the top layer and the basic layer, the composition according to the invention should be prepared by the same process as that used for the composition of the basic layer. This means that, for example, when sprayable compositions are used, both the composition according to the invention and the composition for the basic layer should be spray dried. When the dry process is employed, both compositions should be prepared dry.

The tiles are produced by first introducing the composition for the basic layer into the mould and then introducing the composition according to the invention, which has optionally been colored by the addition of coloring substances, and the two layers are then moulded together. Moulding is followed by drying and firing.

The invention will now be further illustrated with the aid of the following Example, which should not be regard as a limitation.

EXAMPLE

A conventional stoneware body having a shrinkage in drying and firing of 10.2% and a thermal coefficient of expansion of $79 \times 10^{7\circ}$ $K^{-1}$ (at 20° to 400° C.) was worked up in a mixing granulator to form a body granulate having a particle size of from 50 to 500 μm.

The material for the top layer has the following composition:

| | |
|---|---|
| Clay (white burning) | 18% by wt. |
| Wollastonite | 19% by wt. |
| Potassium feldspar | 13% by wt. |
| Sodium feldspar | 5% by wt. |
| Nepheline-Syenite | 7% by wt. |
| Frit (alkali metal-Ca-Zn-aluminosilicate) | 19% by wt. |
| Calcined kaolin/clay | 12% by wt. |
| Calcined aluminium oxide | 7% by wt. | and a shrinkage in drying and firing of 10.0% and a thermal coefficient of expansion of $72 \times 10^{-7\circ}$ $K^{-1}$ (at 20° to 400° C.) was granulated by the same process.

The composition for the basic layer and the composition for the top layer were introduced layerwise one after the other in a ratio of 4:1 into the mould of a hydraulic press and moulded under a pressure of 150 bar to form tiles measuring $15 \times 15$ cm.

After 2 hours' drying at 130° C., the mouldings were fired in a roller furnace at 1200° C. for a firing time of 70 minutes.

The tiles showed no deformation after firing. The water absorption of the upper surface was 0. Ink spots could be completely removed with a moist sponge.

What is claimed is:

1. Ceramic composition for the production of the top layer of two-layered stoneware or semi-stoneware tiles which composition consists essentially of:

| | |
|---|---|
| white burning kaolin clay | 13–40% by weight, |
| Wollastonite | 0–25% by weight, |
| Potassium feldspar | 8–32% by weight, |
| Sodium feldspar | 5–15% by weight, |
| Lithium feldspar | 0–12% by weight, |
| Nepheline-Syenite | 3–15% by weight, |
| Alkali Metal-Ca—Zn-aluminosilicate frit | 0–25% by weight, |
| ZnO | 0–5% by weight, |
| Calcined clay | 6–24% by weight, |
| Calcined aluminum oxide | 3–16% by weight, and |
| $ZrSiO_4$ | 0–10% by weight, | said composition having a shrinkage in drying and firing of from 4 to 12% and a thermal coefficient of expansion of $(50-90) \times 10^{-7\circ}$ $K^{-1}$ at 20° to 400° C.

2. Ceramic composition according to claim 1 containing up to 5% by weight of coloring substances.

3. Ceramic composition according to claim 1 containing up to 5% by weight of pigments.

* * * * *